Oct. 3, 1950
F. MINUTILLO
2,524,631
CRANBERRY HARVESTER
Filed Nov. 6, 1947
3 Sheets-Sheet 1
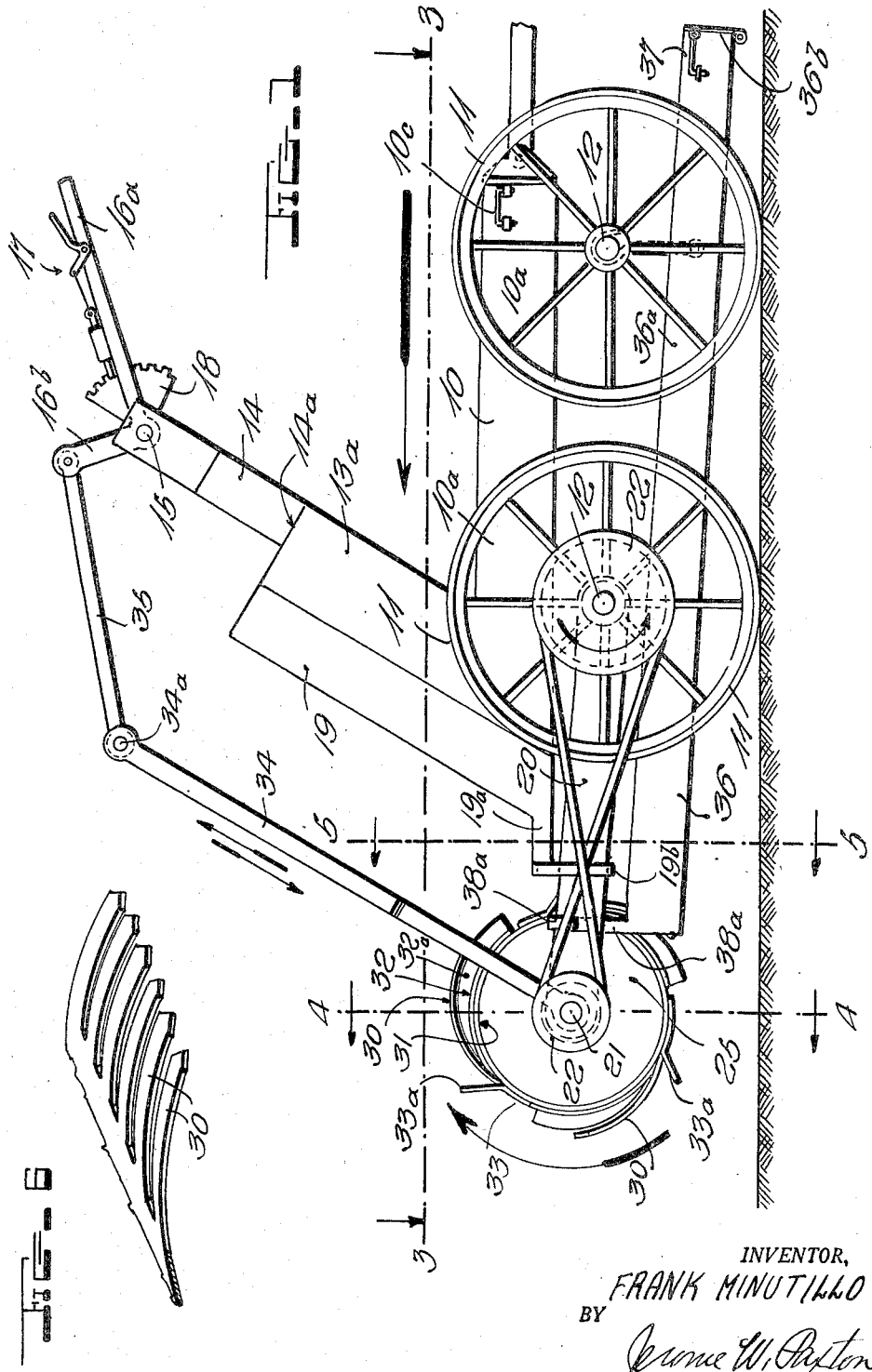
INVENTOR,
FRANK MINUTILLO
BY
Jerome W. Payton
AGENT

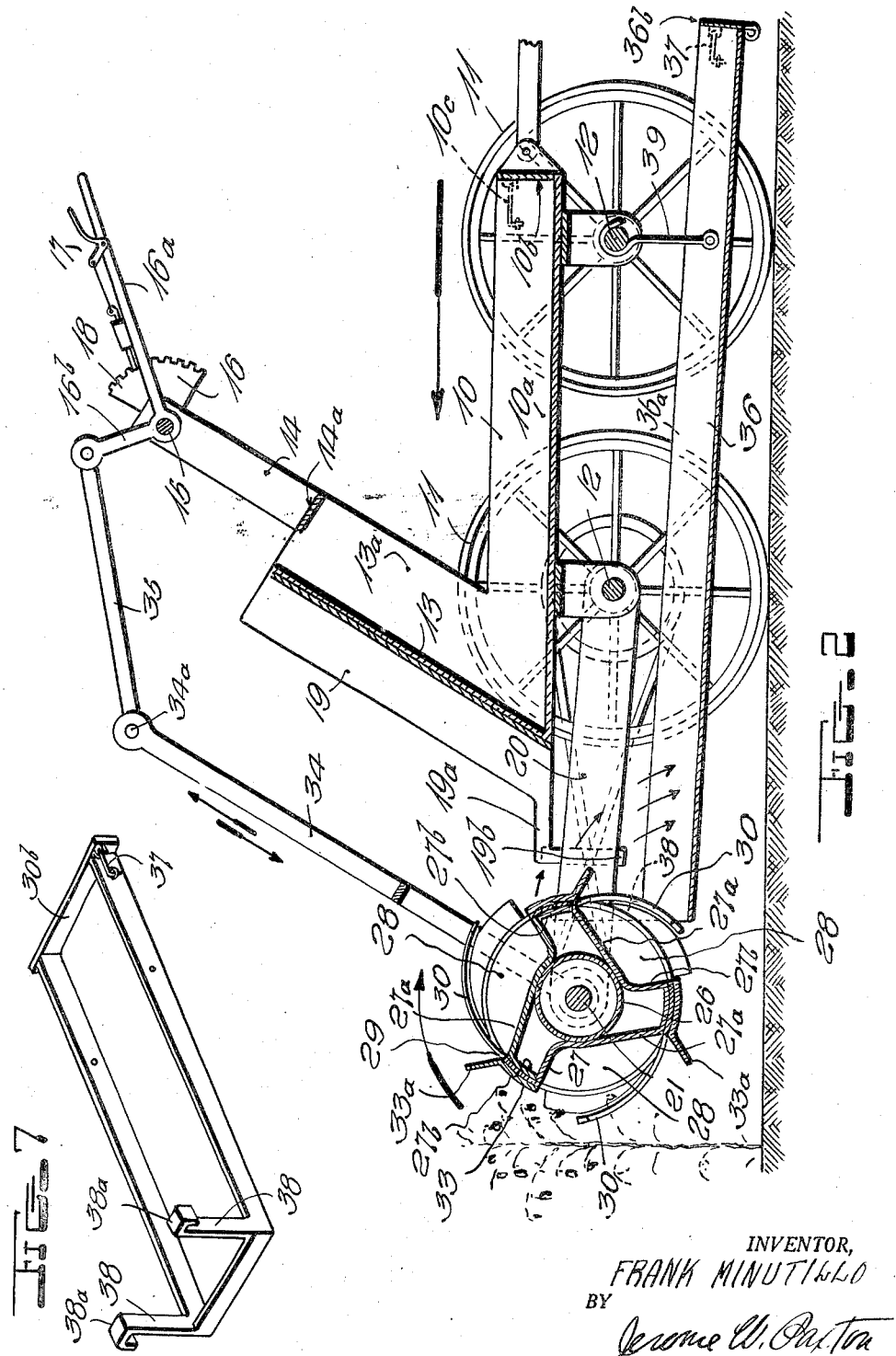

Oct. 3, 1950     F. MINUTILLO     2,524,631
CRANBERRY HARVESTER
Filed Nov. 6, 1947     3 Sheets-Sheet 3
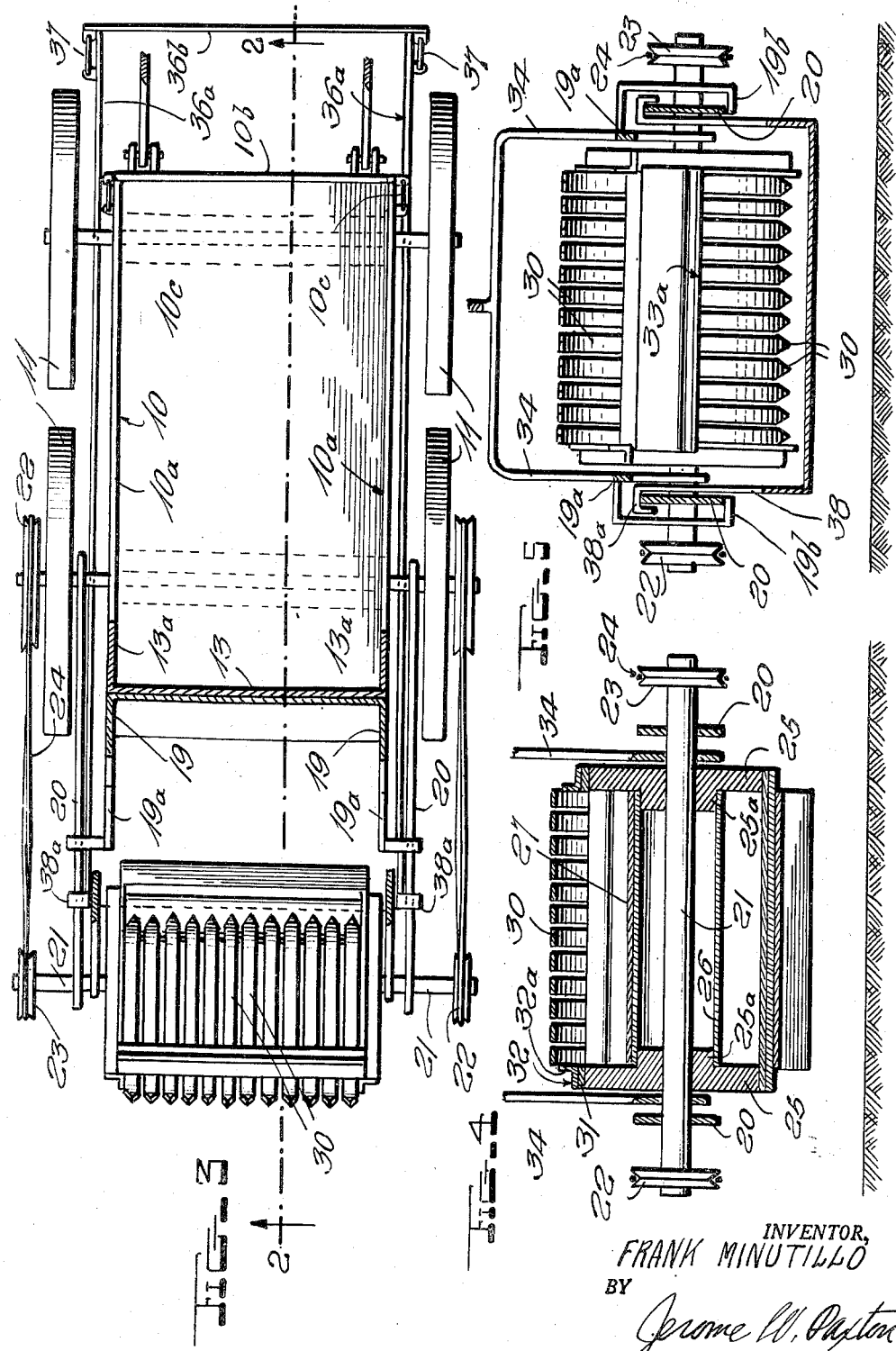
INVENTOR,
FRANK MINUTILLO
BY
Jerome W. Paxton
AGENT Patented Oct. 3, 1950

2,524,631

UNITED STATES PATENT OFFICE 2,524,631

CRANBERRY HARVESTER

Frank Minutillo, Barnegat, N. J.

Application November 6, 1947, Serial No. 784,376

6 Claims. (Cl. 56—330)

This invention relates to cranberry harvesters, pertaining more particularly to a simple form of apparatus usable in harvesting cranberries from the habitat in which they are grown. Because of the conditions under which cranberries are grown, the harvesting of cranberries is somewhat of a difficult matter, due to the fact that these berries have their growth under conditions which may vary as between the localities in which the growth takes place. In some locations the vines or the like on which the berries are grown, lie fairly close to the ground surface, and in such case the vines tend to become somewhat meshed; in harvesting berries from such vines, it is obviously necessary to raise the vines to permit of the removal of the berries by the instrument or mechanism being used, a condition which tends to cause uprooting of the vines under the pulling action that is provided when the berries are being removed from the vine. In other localities the vines tend to extend more or less vertically, thus placing the berry zone some distance above the ground; in such cases, the pulling action presented at the time of removing the berries will also tend to uproot the vines or stalks through the fact that a greater leverage effect is being placed upon the base portion of the vine or stalk so that there is a tendency of the stem to be bent over and possibly become broken, while the raised berry zone offers a greater tendency to draw the stem upwardly and thus to uproot the vine or stalk.

When harvesting by hand, the operative is able to somewhat govern his procedure by the nature of the plant growth with which he is called upon to deal. However, where the harvesting is by an apparatus, the operation is generally similar under all conditions, so that a harvester particularly adapted to meet the conditions of one type may be more or less inefficient when called upon to meet the conditions of a different type. As a result of this, the harvesters heretofore contemplated are generally designed to meet particular conditions and thus tend to be more or less localized as to the scene in which they are more particularly designed to be used. The present invention is designed more particularly for operation under either condition, but seemingly has its best action where the berry zone is provided by the stalk-like type of plant. The structure of the harvester is somewhat simple and relatively inexpensive, but capable of efficient service under the difficult conditions under which apparatus of this type must have its operation.

The object of the invention, therefore, is to provide a harvester which is capable of use under any of the usual conditions present within the particular cranberry locations, and providing such action efficiently and with a minimum likelihood of uprooting the plants upon which the cranberries are grown, doing this with an apparatus which is sturdy and capable of withstanding hard usage; which is capable of being used within a setting in which the berry zone is of materially different vertical heights from the ground surface; in which the harvester is simplified by the omission of traveling conveyors for collecting the harvested berries; and which is of relatively low cost of production.

To these and other ends therefor, the nature of which will be more clearly understood as the invention is hereinafter disclosed in detail, said invention consists in the improved constructions and combinations of parts hereinafter particularly described in the specification, illustrated in the accompanying drawings, and more particularly pointed out in the appended claims.

In the accompanying drawings, in which similar reference characters indicate similar parts in each of the views:

Figure 1 is a side elevation of one form of harvester contemplated by the present invention.

Figure 2 is a vertical longitudinal section of the harvester shown in Figure 1, and indicated as taken on line 2—2 of Figure 3.

Figure 3 is a horizontal sectional view taken on line 3—3 of Figure 1.

Figure 4 is a vertical sectional view taken on line 4—4 of Figure 1.

Figure 5 is a vertical sectional view taken on line 5—5 of Figure 1.

Figure 6 is a perspective view of a portion of one of the blades or combs used in the harvester.

Figure 7 is a perspective view illustrating a collecting formation used in the apparatus.

The present apparatus is in the form of a wheeled carrier which is advanced in suitable manner by applying pressure in its rear end zone, the pressure being produced, for instance, by the use of a tractor which is coupled to the rear of the carrier. The carrier includes a body portion on which is mounted a leverage assembly by means of which the active berry picking nose of the carrier may be adjustably raised and lowered, the nose being carried by a frame pivotally connected to the under portion of the body in such manner as to swing about the axis of the front wheels of the carrier. In addition, the carrier includes a berry collecting formation which is suspended from the axle of the rear wheels of the carrier and which has its front end supported by the nose frame in such manner as to be capable of being raised relative to the frame in a limited manner, the collector formation being so mounted as to tend to incline downwardly toward its rear portion to thereby permit the berries received thereby to automatically move toward the rear of the formation by gravitation. Since the nose is designed to remove the berries from their vine or other stalk developments, the continued rotation of the nose permits the nose to deliver the removed berries to be discharged into the forward end zone of the collector formation, so that the advance of the carrier will gradually collect the removed berries in the rear zone of the collector formation from which they can be readily removed at desirable periods and be transferred to a larger receptacle which may itself be within the body, or form part of the tractor mechanism. For a clearer understanding of the invention, a detailed description thereof is now presented.

The body 10 of the carrier is mounted upon four wheels 11, the rear wheels being located below the rear zone of the body, while the pair of front wheels are located at an intermediate point in the length of the body, the pairs of wheels being mounted upon suitable axles 12 supported from the bottom of the body in suitable manner, the plane of the under face of the body being located in spaced relation to the plane through the axes of the pairs of wheels. The body 10 may be of suitable formation, and is shown as having sides 10a and a rear end 10b; the latter may be hinged or otherwise secured to the bed of the body and detachable—as by the use of hooks 10c (Fig. 2)—to permit of ready removal of content. The sides and end wall of the body are so dimensioned that it can be employed to form a storage receptacle for berries removed from the collector formation, presently described, if desired. However, the body may also serve to carry a suitable support for an operator of the mechanism, should it be desired that the manipulation of the height of the nose be controlled by an operator on the carrier, rather than one carried by the power source in the rear of the carrier.

The front end zone of the carrier is formed with an upwardly-extending and rearwardly-inclined planar member 13 which extends upwardly a suitable distance above the tops of the sides 10a, member 13 serving to complete the forward zone of the bin-like arrangement of the body. The member 13 also has side walls 13a extending rearwardly in the vertical plane of the sides 10a, these side walls 13a being designed to form a support for a suitable frame 14 carried by a member 14a mounted at the top of the side walls 13a, member 14a bridging the opposing side walls 13a. The upwardly extending member 14 is designed to carry a shaft 15 on which is mounted a suitable angle lever 16, the arms of which extend angularly to each other with arm 16a projecting rearwardly from shaft or pivot 15 and carrying a suitable latch operating mechanism 17 adapted to cooperate with a notched segment 18 carried by the frame member 14. Arm 16b extends at approximately right angles to that of arm 16a and tends to extend forwardly of a vertical plane through shaft 15, the free end of arm 16 being adapted to be pivotally connected with the operating mechanism, as presently described, the point of connection swinging arcuately as arm 16a is adjusted from one position to another relative to the segment 18.

Member 13 also carries on its front face, side walls 19 which project forwardly practically in the plane of the side walls 13a, the lower zone of walls 19 extending forwardly a suitable distance, as at 19a, the advance ends of these being provided with downwardly extending members or fingers 19b which are adapted to serve as restricting guides for the nose construction, presently described, the fingers 19b lying outside of such nose formation and thus preventing material side sway of the latter.

The nose formation for picking the berries is mounted upon a pair of arms 20 having their rear ends mounted upon the front axle and then extending forwardly to a point in advance of fingers 19b, the arms being pivotally mounted upon the shaft. The nose formation is mounted in the forward end zone of said arms, such nose formation including a shaft 21 which extends through the arms and thus provides a support for the nose structure. The front axle is provided with a pulley 22, while the front shaft 21 is provided with a pulley 23, these being connected by a drive belt 24 of suitable type, this arrangement being duplicated at the opposite ends of the axle and shaft, pulleys 22 lying outside of the front wheels. The front wheels and front axle are so connected that the traction of the wheels serves to rotate the front axle and thus causes the pulleys 22 to become drive wheels of the assembly operative to rotate shaft 21.

Mounted on the shaft 21, to rotate therewith, are end members 25 of the nose assembly, the end members 25 having an inwardly projecting portion in the central zone of the members and of circular contour, these projections, indicated at 25a being adapted to receive and support an annular member 26 which connects the opposing projecting portions.

Mounted on member 26 is a sheet metal formatino 27 of more or less special contour. In Figure 2, this member is shown as so shaped as to provide three equally-spaced arms 27a, these arms extending in an outward direction and varied somewhat from a radius extending from shaft 21. Each arm is hollow with respect to its side walls, thus providing a considerable width to the arm with the outer zone of the arm connected by a connecting wall 27b which extends arcuately and is symmetric to shaft 21. While the drawings show three of such arms, it will be understood that this is illustrative only, it being understood that the member may have a greater number of arms than the number shown, the arms, however, being equally spaced regardless of the number. While the member 27 is shown as an integral structure, it is to be understood that the member may be formed sectional, if so desired.

The particular contour thus described provides a succession of open-faced cavities 28 of which the bottom and side walls are provided by the one of the side walls of one arm and the opposite side wall of the adjacent arm, the end walls of the cavity being provided by the outer zones of ends 25; since the latter are of circular contour, it will be understood that such end walls of the cavities are practically circularly arcuate peripherally.

Mounted on each of the outer walls 27b of the arms is a toothed member or comb 29, the comb carrying a plurality of fingers 30 in spaced apart relation, as more particularly shown in Figure 6, the spacing being sufficient to permit twigs or vine tendrils to pass between adjacent fingers, but is insufficient to permit berries from passing therethrough. The fingers 30 are pointed at their free ends, with each finger extending in an arcuate path which is symmetrical to the circular contour of end members 25, the result being such that the free ends of the fingers are spaced outwardly a considerable distance from such circular contour of the end members, as seen more particularly in Figure 2. The particular formation is such that as shaft 21 is rotated and thereby rotates the assembly thus described, the outer ends of the fingers will traverse a path of somewhat greater diameter than the inner end of the slotted zone provided by the fingers, the free ends of the fingers thus reaching out and passing through the berry stems or vines, the continued advance of the fingers causing the inner face of the comb to gradually traverse the berry stem through the fact that the arcuate direction of length of the comb fingers gradually decreases the radial distance between such inner face and shaft 21; hence, as the comb advances, the decrease in radius will gradually bring the berry of a laden stem into contact with the inner face of the comb, whereupon the continued advance of the fingers will cause the berry to be moved over the comb inner face and under a drawing tension such as will detach the berry from its stem; upon release of the berry in this way, the stem passes out from the space between the teeth, the berry then simply falling downward into the cavity 28 over which the comb is extending. Due to the fact that the curvature of the arcuate teeth of the comb varies at a slow rate, it is apparent that since a berry still connected with its stem is located on the inner side of the comb, the pressure applied onto the berry increases at a very slow rate, with the result that no sudden drawing tension is applied to the stalk or stem, and, in addition, the pressure is such as to not affect the berry itself to break the surface or to provide a mashing action on the berry.

As indicated more particularly in Figure 4, the periphery of the end walls 25 is provided with an annular member 31 to which is applied a succession of arcuate members 32, each of which carries a flange 32a extending radially outward at the side edge of the toothed portion of the comb; the flange 32a is formed with its outer periphery of arcuate contour and lies slightly spaced from the plane of the inner faces of the comb teeth. The members 32 are designed to carry the side walls of the cavities 28 close to the plane of the comb teeth, so that berries which may be picked up by the teeth and subjected to the picking tension, will not pass out of the cavity when the berry is released from its stem, should the required tension be such as to tend to set up a "flying" characteristic at the time when the berry is released from the stem. The slight spacing permits of yielding of teeth without disturbing the teeth alinement.

Since the upward movement of the teeth and the slow-rate drawing action provided by the form of the teeth may tend to draw the plant stem laterally and thus tend to set up the conditions of breakage adjacent the ground or even uprooting of the plant, the nose is additionally provided with means designed to prevent any material lateral movement of the stem sufficient to set up the breakage or uprooting action referred to. This means is in the form of a bar 33 which extends laterally across the face of the nose, this bar being individual to a comb and secured to the periphery of the end walls 25, each bar being secured in position in overlying relation to the arms which form the member 27. Each bar 33 includes an outwardly extending portion 33a which extends at an angle varied from that of a radius of the nose as well as varied from the contour of the teeth, the outer edge of the portion 33a being located a distance outwardly from the securing portion of the bar, such distance being approximately equal to the distance which the free end of a tooth projects outwardly from the end wall, so that the leading point of the teeth and such outer edge of portion 33a travel in approximately the same path. The base of portion 33a is located practically at the base of the teeth of the comb, each of the arms having its individual bar and portion 33a, the result being that as the nose rotates and the teeth of a comb pick up berries which may lie within the path of travel of the free ends of the teeth, and which tend to produce the pulling tension referred to, the continued rotation of the nose will bring the succeeding portion 33a into proximity to and then contact with the stem of the plant; as the berry travels inwardly of the comb teeth through rotation of the nose, the berry is necessarily advanced inwardly due to the curvature of the teeth, the result being that when portion 33a provides a contact with the stalk, the berry will have approached the lower zone of the teeth so that continued movement of the nose will tend to provide a slowly increasing pulling action on the berry with the stalk resisting such pressure through the presence of the portion 33a. At such time the pulling pressure becomes practically limited to a lateral direction relative to the stem of the stalk while the outer edge of portion 33a is serving to prevent this pressure from extending lengthwise of the stalk so that the liability of breaking or uprooting the stalk is reduced to a minimum through the fact that the tension no longer is exerted upwardly but laterally; consequently, there is little likelihood of damaging the stalk or vine below the berry zone and the likelihood of breaking the stem within such zone is limited by the fact that although the pressure is being increased as the berry traverses the remainder of the slot, the free edge of portion 33a is also moving upwardly over the stem to protect the stem from such breakage.

The nose is supported by an articulated frame connection between shaft 21 and the free end of arm 16b. The frame is made up of a lower section 34 formed of a pair of side arms mounted respectively on opposite ends of shaft 21, said arms being connected at their upper ends by a suitable rod connection 34a to which is secured a link 35 which connects the rod with the free end of arm 16b. By changing the position of arm 16a relative to the segment 18, the nose can be raised and lowered to a desired point. In this way, it is possible to deal with the plans whether the berry zone is comparatively close to the ground, as when carried by a vine-like plant formation, and raised to a desired height, or when the berry zone is elevated as when carried by stalk-like plants. In either adjusted location, the teeth or fingers of the nose will operate efficiently to pick or pluck the berries.

36 indicates the collecting formation for the plucked berries, this being in the form of an open topped receptacle having side walls 36a and a pivoted rear wall or gate 36b. The collecting formation extends in fore and aft direction and is located between the wheels of both pairs, being supported in its rear zone by suitable hooks 37 removably mounted on the rear axle, with the hooks spaced apart on the axle and connected with the opposite side walls 36a, the hook connection being at some distance from the rear end of the formation so that the gate 36b lies in rear of the rear pair of wheels. The front end of the formation 36 extends into proximity to the travel path of teeth 30, the front end being open, thus permitting the free ends of the teeth and the outer edge of bar 33 to pass within such open end. The sides 36a, at such forward end, carry upwardly extending arms 38 which terminate in a hook 38a which is designed to overlie the swinging arms 20 which support the nose, arms 38 having a length such that when the formation is in position, its rear end rests somewhat lower than its front end, regardless of the adjusted position of arms 20.

As will be understood, this constancy of position of the formation 36 relative to the nose, places the formation in position where, as the nose rotates, thus advancing the cavities 28 carrying the berries plucked by the teeth of the comb which overlies the cavity, the cavity movement will gradually bring the cavity to a position where its advance wall becomes inclined downwardly to the horizontal as it begins to approach the position of the front end of formation 36, the result being that the berry content of a cavity will pass out of the cavity over such advance wall as the nose continues its rotative advance, the advance wall of the cavity being so arranged relative to the bottom of the formation 36 that the inclination of the wall will become such as to permit complete emptying of the cavity before such advance wall reaches the zone of the bottom of formation 36. Due to this condition, it will be understood that the berries delivered from the cavity drop only a short distance when leaving the wall, thus tending to prevent damage to the berry skins. It will also be understood that should there be any tendency of berries to fly about within the zone of the travel path where the base of the comb has passed upwardly beyond a plane passing horizontally through shaft 21, outward flying will be prevented by the comb teeth which then overlie the cavity, and should the berries tend to pass out between the free ends of the teeth and the advance wall of the cavity, the direction of movement will be such as to cause such berries to drop into the formation 36.

The operation of the harvester thus described is more or less apparent. The nose is adjusted in such manner as to cause the free ends of the comb teeth to contact the vines or stems of the natural berry support below the berry zone so that the latter zone will therefore pass to the inner side of the comb as the harvester is advanced; if the berry zone is carried by vines the movement of the teeth in the circular path will tend to raise the zone with vine tendrils extending through the spaces between teeth; while the comb is then in the early stages of its upward travel, the length of the spaces between teeth is such as to permit tendrils to freely move through the space and thus avoid pulling stresses on the vine tending to uproot the vine. When, during the upward travel of the comb, the tooth zone encounters a berry or berries, the outward passage through the space of the tendril is arrested, but inasmuch as the berry and its tendril can move downward relative to the space between teeth, the pull on the tendril increases at a slow rate and tends to be individual to the particular tendril; as the pull is increased in the direction of its major values, the bar 33 becomes active to provide an opposing resistance with the result that the pulling stress then is practically limited to a horizontal direction and applied in such manner as to quickly pluck the berry from its supporting tendril, to drop into cavity 28 and be passed to receptacle 36 as the nose rotation carries the forward wall of the cavity below a horizontal plane extending through the nose axis.

Since the forward end of the receptacle bed extends close to the travel path of the teeth and is located but a short distance below such plane, the length of the berry drop is small, decreasing as the cavity advances, thus avoiding damage to the plucked berry during transfer. And since the receptacle bed inclines downwardly toward its rear, the deposited berries quickly leave the forward zone so that there is no accumulation of berries within such depositing zone. The receptacle is of considerable dimensions so that a considerable accumulation can be developed before requiring removal. When removal is desired or necessary, the lower and rear end gate can be manipulated to gradually permit the content to pass into baskets or other form of transfer formations and be placed within a storage container which may be carried by the power device, or the body bed may be employed for the purpose.

If the berry supports are in the form of stalks—as indicated in the drawings—the nose is raised to the desired point, where a similar action to that above described takes place, the blade-like portions 33a of bars 33 becoming active to restrict the pulling stress on the stalk stem to a horizontal direction so that the plants are not materially damaged or uprooted by the berry-plucking operation.

In other words, the harvester not only plucks the berry from its natural support, but does it in such manner that the berry is uninjured either by squeezing or crushing or through breaking or otherwise injuring the skin, either while plucking the berry or when collecting the berry accumulations; in addition, the vines or stalks are protected against pulling stresses such as would tend to break or uproot the plant, thus preserving the plant for further berry-growing purposes. The adjustability of the height of the nose—without materially affecting the operation—enables the harvester to be efficient with varied berry habitats, thus making it applicable for service under different service conditions, doing this with a structure which is comparatively simple in type, efficient in operation, and which can be manufactured at comparatively low cost.

While the harvester has been developed for service in the harvesting of cranberries, it will be understood that it is equally operative in the harvesting of other types of berries the habitats of which are generally similar to those of the cranberry, and the invention is therefore not deemed to be restricted to the cranberry service, the latter being employed in the disclosure of the invention because it presents the more difficult phases of berry harvesting.

While I have herein shown and described a particular embodiment of the invention, it will be readily understood that changes and/or modifications therein may be found desirable or essential in meeting the exigencies of service or the individual desires of a user; I therefore reserve the right to make any and all such changes and/or modifications therein as may be found desirable or essential insofar as the same may fall within the spirit and scope of the invention as expressed in the accompanying claims, when broadly construed.

I claim:

1. In an apparatus for harvesting cranberries and the like, a frame, ground-engaging wheels for the frame, a rotatable drum supported at the forward end of the frame, a drive connection between one of the wheels and the drum whereby movement of the frame will impart rotary movement to the drum, a plurality of toothed combs on the periphery of the drum at spaced intervals, the free end of the teeth of each comb terminating in the same plane, said drum having a cavity therein for each toothed comb underlying each comb adapted to receive the berries plucked by the toothed comb disposed thereabove, a bar extending longitudinally of the drum for each toothed comb for limiting the pulling tension on the berry to prevent breaking or uprooting of the berry support, and a berry collecting receptacle supported by the frame for receiving the plucked berries deposited in the cavities of the drum during rotation.

2. A cranberry harvester as claimed in claim 1 wherein the drum support includes a pair of arms pivotally mounted to the frame and to the drum, a standard supported by and extending upwardly from the frame, a pair of arms connected at one end to the drum axle, a link pivotally connected to the free end of said last named arms, a bell crank lever rotatably supported by said standard, a pivotal connection between the lateral arm of the bell crank and said link, a latching member carried by the other arm of the bell crank lever, and a toothed segment on said standard whereby the drum may be adjusted vertically.

3. A cranberry harvester as claimed in claim 1 wherein said drum includes an axle carrying spaced apart end walls, an annular member supported by the end walls and bridging the distance therebetween, a sheet metal unit presenting a plurality of equi-spaced hollow arms with the arm extremities located substantially in the peripheral zone of the end walls supported by the annular member, said sheet metal unit bridging the area between the end walls with the unit wall between adjacent ends forming the bottom of a succession of cavities underlying the toothed combs with the sides of each cavity formed by the end walls, and the end extremities of said arms each carrying the base portion of a toothed comb.

4. A cranberry harvester as claimed in claim 3 wherein the extremity of each arm also supports the longitudinally extending bar.

5. A cranberry harvester as claimed in claim 4 wherein each longitudinally extending bar bridges the area between opposite ends of the drum, each bar being externally of the base of the toothed comb with which it cooperates and includes a blade-like portion of similar length extending angularly outward with respect to the travel path of the base of the toothed comb to overlie an inner zone of the toothed comb with the outer edge of the blade-like portion positioned to travel approximately in the travel path of the free ends of the toothed comb.

6. A cranberry harvester as claimed in claim 1 wherein the drum includes an axle carrying spaced apart end walls, an annular member supported by the end walls and bridging the distance therebetween, a sheet metal unit presenting a plurality of equi-spaced hollow arms with the arm extremities located substantially in the peripheral zone of the end walls, said sheet metal unit bridging the area between the end walls with the structure wall between adjacent ends forming the bottom of a succession of cavities underlying the positioned toothed combs, with the sides of each cavity formed by said end walls, a base portion on each toothed comb adapted to be secured to the extremity of one of said arms, and a series of spaced apart teeth extending from the base with the direction of the length of the teeth curved to provide an arcuate formation and with the arc extending asymmetrical to the drum axis to locate the free ends of the teeth spaced radially outward from the travel path of the extremity of the arm by which the toothed comb is carried.

FRANK MINUTILLO.

REFERENCES CITED

The following references are of record in the file of this patent:

UNITED STATES PATENTS

| Number | Name | Date |
| --- | --- | --- |
| 546,777 | Hasey | Sept. 24, 1895 |
| 1,233,089 | Maglathlin | July 10, 1917 |
| 1,622,117 | Jenkins | Mar. 22, 1927 |
| 2,171,548 | Geringer | Sept. 5, 1939 |